(12) United States Patent
Segall et al.

(10) Patent No.: US 9,706,788 B2
(45) Date of Patent: Jul. 18, 2017

(54) SOY PROTEIN PRODUCTS OF IMPROVED WATER-BINDING CAPACITY

(71) Applicant: BURCON NUTRASCIENCE (MB) CORP., Winnipeg (CA)

(72) Inventors: Kevin I. Segall, Winnipeg (CA); Brent E. Green, Warren (CA)

(73) Assignee: BURCON NUTRASCIENCE (MB) CORP., Vancouver, BC.

( * ) Notice: Subject to any disclaimer, the term of this patent is extended or adjusted under 35 U.S.C. 154(b) by 0 days.

(21) Appl. No.: 15/094,386

(22) Filed: Apr. 8, 2016

(65) Prior Publication Data
US 2016/0255861 A1 Sep. 8, 2016

Related U.S. Application Data

(63) Continuation of application No. 13/993,755, filed as application No. PCT/CA2011/001380 on Dec. 16, 2011, now abandoned.

(60) Provisional application No. 61/457,050, filed on Dec. 16, 2010.

(51) Int. Cl.
*A23J 3/16* (2006.01)
*A23J 1/14* (2006.01)

(52) U.S. Cl.
CPC . *A23J 3/16* (2013.01); *A23J 1/14* (2013.01); *A23V 2002/00* (2013.01)

(58) Field of Classification Search
CPC .......................................................... A23J 3/16
See application file for complete search history.

(56) References Cited

U.S. PATENT DOCUMENTS

| | | | | |
|---|---|---|---|---|
| 4,072,670 | A * | 2/1978 | Goodnight, Jr. ......... | A23J 1/14 426/598 |
| 7,838,633 | B2 * | 11/2010 | Samoto ..................... | A23J 3/16 530/378 |
| 2005/0255226 | A1* | 11/2005 | Schweizer ................ | A23J 1/14 426/656 |
| 2010/0203204 | A1* | 8/2010 | Segall ....................... | A23J 1/14 426/330 |
| 2010/0221403 | A1* | 9/2010 | Segall ....................... | A23J 1/14 426/590 |

FOREIGN PATENT DOCUMENTS

WO   WO 2007/003044   * 1/2007

* cited by examiner

*Primary Examiner* — Elizabeth Gwartney

(57) ABSTRACT

Soy protein products are provided which lack the characteristic beany flavor of conventional soy protein isolates and can replace conventional isolates in various food products to provide food products having improved flavor.

10 Claims, No Drawings

US 9,706,788 B2

SOY PROTEIN PRODUCTS OF IMPROVED WATER-BINDING CAPACITY

REFERENCE TO RELATED APPLICATIONS

This application is a Continuation of U.S. patent application Ser. No. 13/993,755 filed Sep. 19, 2013 which itself is a U.S. National Phase filing under 35 USC 371 of PCT/CA2011/001380 filed Dec. 16, 2011 claiming priority under 35 USC 119(e) from U.S. Provisional Patent Application No. 61/457,050 filed Dec. 16, 2010.

FIELD OF INVENTION

The present invention relates to near neutral pH soy protein products and their uses.

BACKGROUND TO THE INVENTION

In copending U.S. patent application Ser. No. 12/975,805 filed Dec. 22, 2010 (US Patent Publication No. 2011-0165314 published Jul. 7, 2011), assigned to the assignee hereof and the disclosures of which are incorporated herein by reference, there is described the preparation of a clean tasting, non-beany soy protein product that has a near neutral natural pH and can replace conventional soy protein isolate products in various food applications including nutritional bars, baked goods and processed meat products. Patent application Ser. No. 12/975,805 also demonstrated that the functional properties of the soy protein product may be modified, with the protein solubility reduced and the water binding capacity increased by including a heat treatment step in the preparation of the product.

Such soy protein product is derived from the novel soy protein product described in U.S. patent application Ser. No. 12/603,087 filed Oct. 21, 2009 (US Patent Publication No. 2010-0098818 published Apr. 22, 2010) and Ser. No. 12/923,897 filed Oct. 13, 2010 (US Publication No. 2011-0038993 published Feb. 17, 2011), assigned to the assignee hereof and the disclosures of which are incorporated herein by reference. U.S. patent application Ser. Nos. 12/603,087 and 12/923,897 describe the production of a novel soy protein product, preferably an isolate that produces transparent and heat stable solutions at low pH and, therefore, may be used for protein fortification of, in particular, soft drinks and sports drinks, as well as other aqueous systems, without precipitation of protein.

The soy protein product produced therein has a unique combination of parameters not found in other soy protein isolates. The product is completely soluble at acid pH values of less than about 4.4 and solutions thereof are heat stable in this pH range, permitting thermal processing, such as hot fill applications. No stabilizers or other additives are necessary to maintain the protein in solution or suspension. The soy protein solution has no "beany" flavour and no off odours. The product is low in phytic acid and no enzymes are required in the production of the soy protein product. The soy protein product is also highly soluble at about pH 7.

The novel soy protein product having a soy protein content of at least about 60 wt % (N×6.25) on a dry weight basis (d.b.), preferably an isolate having a protein content of at least about 90 wt %, is produced by a method which comprises:

(a) extracting a soy protein source with an aqueous calcium salt solution, particularly calcium chloride solution, to cause solubilization of soy protein from the protein source and to form an aqueous soy protein solution, (b) separating the aqueous soy protein solution from residual soy protein source, (c) optionally diluting the aqueous soy protein solution, (d) adjusting the pH of the aqueous soy protein solution to a pH of about 1.5 to about 4.4, preferably about 2 to about 4, to produce an acidified clear soy protein solution, (e) optionally heat treating the acidified solution to reduce the activity of anti-nutritional trypsin inhibitors and the microbial load, (f) optionally concentrating the aqueous clear soy protein solution while maintaining the ionic strength substantially constant by using a selective membrane technique, (g) optionally diafiltering the concentrated soy protein solution, (h) optionally pasteurizing the concentrated soy protein solution to reduce the microbial load, and (i) optionally drying the concentrated soy protein solution.

In copending U.S. patent application Ser. No. 12/704,078 filed Feb. 11, 2010 (US Patent Publication No. 2010-0203205 published Aug. 12, 2010), assigned to the assignee hereof and the disclosures of which are incorporated herein by reference, there is described the production of a soy protein product (termed "S702") having comparable properties to the soy protein product provided in accordance with U.S. application Ser. Nos. 12/603,087 and 12/923,897. In application Ser. No. 12/704,078, the soy protein product is produced by extracting soy protein source material with an aqueous calcium salt solution to cause solubilization of soy protein from the protein source and to form an aqueous soy protein solution, separating the aqueous soy protein solution from residual soy protein source, concentrating the aqueous soy protein solution while maintaining the ionic strength substantially constant by using a selective membrane technique, optionally diafiltering the concentrated soy protein solution, and drying the concentrated soy protein solution.

In copending U.S. patent application Ser. No. 12/703,996 filed Mar. 4, 2010 (US Patent Publication No. 2010-0203204 published Aug. 12, 2010), assigned to the assignee hereof and the disclosures of which are incorporated herein by reference, there is described the production of a soy protein product (termed "S7300") having comparable properties to the soy protein product provided in accordance with U.S. Ser. Nos. 12/603,087 and 12/923,897. In application Ser. No. 12/703,996, the soy protein product is produced by extracting a soy protein source material with aqueous calcium chloride solution to cause solubilization of soy protein from the protein source and to form an aqueous soy protein solution, separating the aqueous soy protein solution from residual soy protein source, concentrating the aqueous soy protein solution while maintaining the ionic strength substantially constant by using a selective membrane technique, optionally diafiltering the concentrated soy protein solution, diluting the concentrated and optionally diafiltered soy protein solution into water to cause the formation of a precipitate, separating the precipitate from the diluting water, and drying the separated soy protein precipitate.

In copending U.S. patent application Ser. No. 12/693,714 filed Jan. 26, 2010 (US Patent Publication No. 2010-0189853, published Jul. 29, 2010), assigned to the assignee hereof and the disclosures of which are incorporated herein by reference, there is described the provision of a soy protein product (termed "S200Ca") having comparable properties to the soy protein product provided in accordance with U.S. Ser. Nos. 12/603,087 and 12/923,897. In application Ser. No. 12/693,714, a calcium salt is added to supernatant from the precipitation of a protein micellar mass to provide a solution having a conductivity of about 2 mS to about 30 mS, removing precipitate from the resulting solution to leave a clear solution, optionally adjusting the pH of the clear solution to about 1.5 to about 4.4, concentrating the optionally pH-adjusted clear solution to a protein content of about 50 to about 400 g/L to provide a clear concentrated soy protein solution, optionally diafiltering the clear concentrated protein solution, and drying the concentrated solution.

SUMMARY OF THE INVENTION

One of the important attributes of the soy protein products produced in the above-noted U.S. patent application Ser. Nos. 12/603,087, 12/923,897, 12/704,078, 12/703,996 and 12/693,714 is the clean, non-beany flavour of the products, in contrast to conventional soy protein isolates which possess a characteristic beany flavour.

Although a range of soy protein isolate products are available for food use, with a variety of functional properties, and a variety of intended applications, some of the more common applications for commercial soy protein isolates are in nutrition bars, baked goods and processed meat products.

In accordance with the present invention, there are provided soy protein products, which lack the characteristic beany flavour of conventional soy protein isolates, and can replace conventional isolates in various food products, including those mentioned above, to provide food products having improved flavour and which may be derived from the soy protein products prepared as described in U.S. patent application Ser. Nos. 12/704,078, 12/703,996 and 12/693,714. In general, the procedures described herein result in soy protein products having an increased water-binding capacity.

In accordance with one aspect of the present invention, there is provided a method of producing a soy protein product having a soy protein content of at least about 60 wt % (N×6.25), dry weight basis, which comprises:
(a) extracting a soy protein source with an aqueous calcium salt solution to cause solubilization of soy protein from the protein source and to form an aqueous soy protein solution,
(b) separating the aqueous soy protein solution from residual soy protein source,
(c) concentrating the aqueous soy protein solution while maintaining the ionic strength substantially constant by using a selective membrane technique,
(d) optionally diafiltering the concentrated soy protein solution, and
(e) optionally drying the concentrated and optionally diafiltered soy protein solution,
wherein:
(A) the aqueous soy protein solution resulting from step (b) is heat treated to precipitate soy protein therefrom and either (i) the entire heated solution is dried to provide the soy protein product or (ii) precipitated soy protein is recovered from the heated solution and the recovered precipitate is dried to provide the soy protein product, or
(B) the concentrated and optionally diafiltered soy protein solution from step (d) is heat treated to precipitate soy protein therefrom and either (i) the entire heated solution is dried to provide the soy protein product or (ii) the precipitated soy protein is recovered from the heated solution and the recovered precipitate is dried to provide the soy protein product, or
(C) the concentrated and optionally diafiltered soy protein solution is dried, the dried material from step (e) is re-suspended in water, the resulting solution is adjusted to a pH of about 6 if necessary, and the re-suspended material is heat treated to precipitate soy protein therefrom and either (i) the entire heat treated material is dried to provide the soy protein product or (ii) the precipitated protein is recovered from the heated material and the recovered precipitated protein is dried to provide the soy protein product.

In accordance with another aspect of the present invention, there is provided a method of producing a soy protein product having a soy protein content of at least about 60 wt % (N×6.25), dry weight basis, which comprises:
(a) extracting a soy protein source with an aqueous calcium salt solution to cause solubilization of soy protein from the protein source and to form an aqueous soy protein solution,
(b) separating the aqueous soy protein solution from residual soy protein source,
(c) concentrating the aqueous soy protein solution while maintaining the ionic strength substantially constant by using a selective membrane technique,
(d) optionally diafiltering the concentrated soy protein solution,
(e) diluting the concentrated soy protein solution into water to cause the formation of a precipitate,
(f) separating the precipitate from the diluting water, termed the supernatant, and
(g) optionally drying the separated soy protein precipitate, wherein:
(A) the separated soy protein precipitate from step (f) is dried and the dried protein is re-suspended in water, the resulting suspension is adjusted to a pH of about 6 if necessary, the suspension is heat treated and either (i) the entire heated suspension is dried to provide the soy protein product or (ii) the insoluble protein is recovered from the heated suspension and the recovered insoluble protein is dried to provide the soy protein product, or
(B) the separated soy protein precipitate from step (f) is re-suspended in water and the suspension is heat treated and either (i) the entire heat treated solution is dried to provide the soy protein product or (ii) the insoluble protein is recovered from the heat treated suspension and the recovered insoluble protein is dried to provide the soy protein product.

In accordance with a further aspect of the present invention, there is provided a process of preparing a soy protein product having a protein content of at least about 60 wt % (N×6.25) on a dry weight basis, which comprises:
(a) adding calcium salt or other divalent salt to supernatant from the precipitation of a soy protein micellar mass to provide conductivity of about 2 mS to about 30 mS,
(b) removing precipitate from the resulting solution to leave a clear solution,
(c) adjusting the pH of the clear solution to about 1.5 to about 4.4,
(d) concentrating the pH-adjusted clear solution to a protein content of about 50 to about 400 g/L to provide a clear concentrated soy protein solution,
(e) optionally diafiltering the clear concentrated protein solution, and (f) optionally drying the concentrated and optionally diafiltered solution, wherein:

(A) the concentrated and optionally diafiltered solution is dried in step (f) and the dried soy protein product is formed into an aqueous solution, the pH of the aqueous solution is increased to about pH6 to precipitate soy protein therefrom, the pH-adjusted material is optionally heat treated, and either (i) the entire pH-adjusted material is dried to provide the soy protein product or the precipitate is recovered from the pH-adjusted material and the recovered precipitate is dried to provide the soy protein product, or (B) the pH of the concentrated and optionally diafiltered solution in step (e) is increased to about 6 to precipitate the soy protein therefrom, the pH-adjusted material is optionally heat treated and either (i) the entire pH-adjusted material is dried to provide the soy protein material or (ii) the precipitate is recovered from the pH-adjusted material and the recovered precipitate is dried to provide the soy protein product.

In accordance with a yet further aspect of the present invention, there is provided a method of producing a soy protein product having a soy protein content of at least 60 wt % (N×6.25), dry weight basis, which comprises:

(a) extracting a soy protein source with an aqueous sodium chloride solution to cause solubilization of soy protein from the protein source and to form an aqueous soy protein solution, (b) separating the aqueous soy protein solution from residual soy protein source, (c) adjusting the pH of the soy protein solution to about 4.5 to cause precipitation of soy protein, (d) recovering the precipitated soy protein, (e) optionally adjusting the pH of the recovered soy protein to about 6, and (f) drying the recovered and optionally pH adjusted soy protein, wherein following the pH adjustment step (c), the pH-adjusted material is heat treated prior to recovery of the precipitate, optional adjustment of the pH of the recovered precipitated protein and drying of the recovered precipitated protein to provide the soy protein product.

While the present invention relates mainly to the production and use of soy protein isolates, it is contemplated that soy protein products of lesser purity may be provided and used having similar properties to the soy protein isolate. Such lesser purity products may have a protein concentration of at least about 60 wt % (N×6.25) d.b.

GENERAL DESCRIPTION OF INVENTION

The initial step of the process of providing the soy protein product according to the procedure of both copending U.S. application Ser. Nos. 12/704,078 and 12/703,996 involves solubilizing soy protein from a soy protein source. The soy protein source may be soybeans or any soy product or by-product derived from the processing of soybeans including but not limited to soy meal, soy flakes, soy grits and soy flour. The soy protein source may be used in the full fat form, partially defatted form or fully defatted form. Where the soy protein source contains an appreciable amount of fat, an oil-removal step generally is required during the process. The soy protein recovered from the soy protein source may be the protein naturally occurring in soybean or the proteinaceous material may be a protein modified by genetic manipulation but possessing characteristic hydrophobic and polar properties of the natural protein.

Protein solubilization from the soy protein source material is effected most conveniently using food grade calcium chloride solution, although solutions of other calcium salts may be used. Where the soy protein product is intended for non-food uses, non-food-grade chemicals may be used. In addition, other alkaline earth metal salts may be also used, such as magnesium salts. Further, extraction of the soy protein from the soy protein source may also be effected using calcium salt solution in combination with another salt solution, such as sodium chloride. Additionally, extraction of the soy protein from the soy protein source may be effected using water or other salt solution, such as sodium chloride solution, with calcium salt, such as calcium chloride, subsequently being added to the aqueous soy protein solution produced in the extraction step. Precipitate formed upon addition of the calcium salt then is removed prior to subsequent processing.

As the concentration of the calcium salt solution increases, the degree of solubilization of protein from the soy protein source initially increases until a maximum value is achieved. Any subsequent increase in salt concentration does not increase the total protein solubilized. The concentration of the calcium salt solution which causes maximum protein solubilization varies depending on the salt concerned. It is usually preferred to utilize a concentration value less than about 1.0 M, and more preferably a value of about 0.10 M to about 0.15 M.

In a batch process, the salt solubilization of the protein is effected at a temperature of from about 1° C. to about 100° C., preferably about 15° C. to about 65° C., more preferably about 15° C. to about 35° C., preferably accompanied by agitation to decrease the solubilization time, which is usually about 1 to about 60 minutes. It is preferred to effect the solubilization to extract substantially as much protein from the soy protein source as is practicable, so as to provide an overall high product yield.

In a continuous process, the extraction of the soy protein from the soy protein source is carried out in any manner consistent with effecting a continuous extraction of soy protein from the soy protein source. In one embodiment, the soy protein source is continuously mixed with the calcium salt solution and the mixture is conveyed through a pipe or conduit having a length and at a flow rate for a residence time sufficient to effect the desired extraction in accordance with the parameters described herein. In such a continuous procedure, the salt solubilization step is effected rapidly, in a time of up to about 10 minutes, preferably to effect solubilization to extract substantially as much protein from the soy protein source as is practicable. The solubilization in the continuous procedure is effected at temperatures between about 1° C. and about 100° C., preferably between about 15° C. and about 65° C., more preferably between about 15° C. and about 35° C.

The extraction is generally conducted at a pH of about 5 to about 11, preferably about 5 to about 7. The pH of the extraction system (soy protein source and calcium salt solution) may be adjusted, if necessary, to any desired value within the range of about 5 to about 11 for use in the extraction step by the use of any convenient acid, usually hydrochloric acid, or alkali, usually sodium hydroxide, as required.

The concentration of soy protein source in the calcium salt solution during the solubilization step may vary widely. Typical concentration values are about 5 to about 15% w/v.

The protein solution resulting from the extraction step generally has a protein concentration of about 5 to about 50 g/L, preferably about 10 to about 50 g/L.

The protein extraction step with the aqueous salt solution has the additional effect of solubilizing fats which may be present in the soy protein source, which then results in the fats being present in the aqueous phase.

The aqueous calcium salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit the oxidation of any phenolics in the protein solution.

The aqueous phase resulting from the extraction step then may be separated from the residual soy protein source, in any convenient manner, such as by employing a decanter centrifuge or any suitable sieve, followed by disc centrifugation and/or filtration, to remove residual soy protein source material. The separated residual protein source material may be dried for disposal. Alternatively, the separated residual soy protein source may be processed to recover some residual protein. The separated residual soy protein source may be re-extracted with fresh calcium salt solution and the protein solution yielded upon clarification combined with the initial protein solution for further processing as described below. Alternatively, the separated residual soy protein source may be processed by a conventional isoelectric precipitation procedure or any other convenient procedure to recover such residual protein.

Where the soy protein source contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution. Alternatively, defatting of the separated aqueous protein solution may be achieved by any other convenient procedure.

The aqueous soy protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% w/v, preferably about 0.05% to about 2% w/v, is employed. The adsorbing agent may be removed from the soy solution by any convenient means, such as by filtration.

If of adequate purity, the resulting aqueous soy protein solution may be directly dried to produce a soy protein product. To decrease the impurities content, the aqueous soy protein solution may be processed prior to drying.

The aqueous soy protein solution may be concentrated to increase the protein concentration thereof while maintaining the ionic strength thereof substantially constant. Such concentration generally is effected to provide a concentrated soy protein solution having a protein concentration of about 50 to about 400 g/L, preferably about 100 to about 250 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 1,000,000 Daltons, preferably about 5,000 to about 100,000 Daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as carbohydrates, pigments, low molecular weight proteins and anti-nutritional factors, such as trypsin inhibitors, which are themselves low molecular weight proteins. The molecular weight cut-off of the membrane is usually chosen to ensure retention of a significant proportion of the protein in the solution, while permitting contaminants to pass through having regard to the different membrane materials and configurations.

The concentrated soy protein solution then may be subjected to a diafiltration step, before or after complete concentration, using calcium salt solution, such as a solution of calcium chloride at the same pH and the same concentration of calcium salt as the extraction solution. If a reduction in the salt content of the retentate is desired, the diafiltration solution employed may be an aqueous calcium salt solution at the same pH but lower salt concentration than the extraction solution. However, the salt concentration of the diafiltration solution must be chosen so that the salt level in the retentate remains sufficiently high to maintain the desired protein solubility. As mentioned, the diafiltration solution is preferably at a pH equal to that of the protein solution being diafiltered. The pH of the diafiltration solution may be adjusted with any convenient acid, such as hydrochloric acid or phosphoric acid or alkali, such as sodium hydroxide. Such diafiltration may be effected using from about 1 to about 40 volumes of diafiltration solution, preferably about 2 to about 25 volumes of diafiltration solution. In the diafiltration operation, further quantities of contaminants are removed from the aqueous soy protein solution by passage through the membrane with the permeate. The diafiltration operation may be effected until no significant further quantities of contaminants or visible colour are present in the permeate or until the retentate has been sufficiently purified so as, when dried, to provide a soy protein product with the desired protein content, preferably an isolate with a protein content of at least about 90 wt % on a dry weight basis. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

The concentration step and the diafiltration step may be effected herein in such a manner that the soy protein product subsequently recovered by drying the concentrated and diafiltered retentate contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The concentration step and the diafiltration step may be effected at any convenient temperature, generally about 2° to about 65° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

There are two main trypsin inhibitors in soy, namely the Kunitz inhibitor, which is a heat-labile molecule with a molecular weight of approximately 21,000 Daltons, and the Bowman-Birk inhibitor, a more heat-stable molecule with a molecular weight of about 8,000 Daltons. The level of trypsin inhibitor activity in the final soy protein product can be controlled by manipulation of various process variables.

For example, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to about 1,000,000 Daltons, operating the membrane at elevated temperatures, such as about 30° C. to about 65° C. and employing greater volumes of diafiltration medium, such as about 10 to about 40 volumes.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the concentrated protein solution before or after diafiltration or may be dry blended with the dried soy protein product. The addition of the reducing agent may be combined with the membrane processing steps, as described above.

If it is desired to retain active trypsin inhibitors in the concentrated protein solution, this can be achieved by utilizing a concentration and diafiltration membrane with a smaller pore size, operating the membrane at lower temperatures, employing fewer volumes of diafiltration medium and not employing a reducing agent.

The concentrated and optionally diafiltered protein solution may be subject to a further defatting operation, if required, as described in U.S. Pat. Nos. 5,844,086 and 6,005,076. Alternatively, defatting of the concentrated and optionally diafiltered protein solution may be achieved by any other convenient procedure.

The concentrated and optionally diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated aqueous protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered soy protein solution resulting from the optional defatting and optional adsorbent treatment step may be subjected to a pasteurization step to reduce the microbial load. Such pasteurization may be effected under any desired pasteurization conditions. Generally, the concentrated and optionally diafiltered soy protein solution is heated to a temperature of about 55° to about 70° C., preferably about 60° to about 65° C., for about 30 seconds to about 60 minutes, preferably about 10 to about 15 minutes. The pasteurized concentrated soy protein solution then may be cooled for drying or further processing, preferably to a temperature of about 15° to about 35° C.

In accordance with the above-mentioned copending U.S. patent application Ser. No. 12/704,078, the concentrated and optionally diafiltered clear aqueous soy protein solution may be dried by any convenient technique, such as spray drying or freeze drying to yield the soy protein product. Alternatively, the concentrated and optionally diafiltered soy protein solution may be adjusted in pH to about 2.0 to about 4.0. The pH adjustment may be effected in any convenient manner, such as by the addition of hydrochloric acid or phosphoric acid. The resulting acidified soy protein solution then is dried. As a further alternative, the pH-adjusted soy protein solution may be subjected to a heat treatment to inactivate heat labile anti-nutritional factors, such as the trypsin inhibitors mentioned above. Such a heating step also provides the additional benefit of reducing the microbial load. Generally, the protein solution is heated to a temperature of about 70° to about 160° C., for about 10 seconds to about 60 minutes, preferably about 80° to about 120° C., for about 10 seconds to about 5 minutes, more preferably about 85° to about 95° C., for about 30 seconds to about 5 minutes. The heat treated acidified soy protein solution then may be cooled to a temperature of about 2° C. to about 65° C., preferably about 20° to about 35° C. The resulting acidified, heat treated soy protein solution then is dried.

In accordance with the copending U.S. patent application Ser. No. 12/703,996, the concentrated protein solution resulting from the concentration step and optional diafiltration step, optional defatting step, optional adsorbent treatment step and optional pasteurization step, is diluted to effect precipitate formation by mixing the concentrated protein solution with water having the volume required to achieve the degree of dilution desired. When the precipitated protein is to be separated from the residual aqueous phase, termed the supernatant, the degree of dilution is generally about 5 fold to about 25 fold, preferably about 10 fold to about 20 fold. The water with which the concentrated protein solution is mixed preferably has a temperature of about 1° to about 65° C., preferably about 15° to about 35° C.

In a batch operation, the batch of concentrated protein solution is added to a static body of water having the desired volume, as discussed above. The dilution of the concentrated protein solution and consequential decrease in ionic strength causes the formation of the protein precipitate. In the batch procedure, the protein precipitate is allowed to settle in the body of water. The settling may be assisted, such as by centrifugation. Such induced settling decreases the moisture content and the occluded salt content of the precipitated protein.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution of the concentrated protein solution.

The mixing of the concentrated protein solution and the diluting water in the pipe initiates the formation of protein precipitate and the mixture is continuously fed from the outlet of the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein precipitate is allowed to settle in the settling vessel and the procedure is continued until a desired quantity of the precipitate has accumulated in the bottom of the settling vessel, whereupon the accumulated precipitate is removed from the settling vessel. In lieu of settling by sedimentation, the precipitate may be separated continuously by centrifugation.

By the utilization of a continuous process for the recovery of soy protein precipitate as compared to the batch process, the initial protein extraction step can be significantly reduced in time for the same level of protein extraction. In addition, in a continuous operation, there is less chance of contamination than in a batch procedure, leading to higher product quality and the process can be carried out in more compact equipment.

The settled precipitate is separated from the residual aqueous phase or supernatant, such as by decantation of the residual aqueous phase from the settled mass or by centrifugation. The precipitate may be washed to remove residual supernatant, such as with about 1 to about 10, preferably about 2 to about 3 volumes of water and then the precipitate recovered again, as above. The optionally washed precipitate may be used in the wet form or may be dried, by any convenient technique, such as spray drying or freeze drying, to a dry form. The dry precipitate has a high protein content, in excess of about 60 wt % protein, preferably at least about 90 wt % protein (N×6.25), and more preferably at least about 100 wt % (N×6.25). The dry precipitate is low in phytic acid content, generally less than about 1.5% by weight.

As mentioned above, the settled protein precipitate formed in the dilution step may be directly dried to yield the protein product. Alternatively, the wet protein precipitate may be re-suspended in water, such as about 2 to about 3 volumes, and re-solubilized by adjusting the pH of the sample to about 1.5 to about 4.4, preferably about 2.0 to about 4.0, using any convenient acid, such as hydrochloric acid or phosphoric acid. The clear protein solution then may be dried by any convenient technique, such as spray drying or freeze drying to a dry form. The dry protein product has a protein content in excess of about 60 wt % protein, preferably at least about 90 wt % protein, more preferably at least about 100 wt % protein (N×6.25).

As a further alternative, the clear, acidified, re-solubilized soy protein solution may be subjected to a heat treatment to inactivate any remaining heat labile anti-nutritional factors. Such a heating step also provides the additional benefit of reducing the microbial load. Generally, the protein solution is heated to a temperature of about 70° to about 160° C. for about 10 seconds to about 60 minutes, preferably about 80° to about 120° C. for about 10 seconds to about 5 minutes, more preferably about 85° to about 95° C. for about 30 seconds to about 5 minutes. The heat treated, acidified soy protein solution then may be cooled for further processing as described below, to a temperature of about 2° to about 65° C., preferably about 20° to about 35° C.

The acidified and optionally heat treated clear solution, may be concentrated to increase the protein concentration thereof. Such concentration is effected using any convenient selective membrane technique, such as ultrafiltration or diafiltration, using membranes with a suitable molecular weight cut-off permitting low molecular weight species, including salt, carbohydrates, pigments, trypsin inhibitors and other low molecular weight materials extracted from the protein source material, to pass through the membrane, while retaining a significant proportion of the soy protein in the solution. Ultrafiltration membranes having a molecular weight cut-off of about 3,000 to 1,000,000 Daltons, preferably about 5,000 to about 100,000 Daltons, having regard to differing membrane materials and configuration, may be used. Concentration of the protein solution in this way also reduces the volume of liquid required to be dried to recover the protein. The protein solution generally is concentrated to a protein concentration of about 50 g/L to about 300 g/L, preferably about 100 to about 200 g/L, prior to drying. Such concentration operation may be carried out in a batch mode or in a continuous operation, as described above.

The soy protein solution may be subjected to a diafiltration step before or after complete concentration using water. The water may be at its natural pH or at a pH equal to that of the protein solution being diafiltered or at any pH value in between. Such diafiltration may be effected using from about 1 to about 40 volumes of diafiltration solution, preferably about 2 to about 25 volumes of diafiltration solution. In the diafiltration operation, further quantities of contaminants are removed from the clear aqueous soy protein solution by passage through the membrane with the permeate. The diafiltration operation may be effected until no significant further quantities of contaminants or visible colour are present in the permeate or until the retentate has been sufficiently purified so as, when dried, to provide a soy protein product with the desired protein content, preferably an isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

The concentration step and the diafiltration step may be effected herein in such a manner that the soy protein product subsequently recovered by drying the concentrated and diafiltered retentate contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The optional concentration step and the optional diafiltration step may be effected at any convenient temperature, generally about 2° to about 65° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

As mentioned above, the level of trypsin inhibitor activity in the final soy protein product can be controlled by manipulation of various process variables.

As previously noted, heat treatment of the acidified aqueous soy protein solution may be used to inactivate heat-labile trypsin inhibitors. Partially concentrated or fully concentrated acidified soy protein solution may also be heat treated to inactivate heat labile trypsin inhibitors.

In addition, the concentration and/or diafiltration steps may be operated in a manner favorable for removal of trypsin inhibitors in the permeate along with the other contaminants. Removal of the trypsin inhibitors is promoted by using a membrane of larger pore size, such as 30,000 to 1,000,000 Daltons, operating the membrane at elevated temperatures, such as 30° to 65° C. and employing greater volumes of diafiltration medium, such as 10 to 40 volumes.

Acidifying and membrane processing the protein solution at a lower pH (1.5 to 3) may reduce the trypsin inhibitor activity relative to processing the solution at higher pH (3 to 4.4). When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added to the wet protein precipitate resulting from the dilution step, may be added to the protein solution formed by acidifying and re-solubilizing the precipitate, may be added to the concentrated solution before or after diafiltration or may be dry blended with the dried soy protein product. The addition of the reducing agent may be combined with a heat treatment step and the membrane processing steps, as described above.

If it is desired to retain active trypsin inhibitors in the concentrated protein solution, this can be achieved by eliminating or reducing the intensity of the heat treatment step, not utilizing reducing agents, operating the concentration and diafiltration steps at the higher end of the pH range (3 to 4.4), utilizing a concentration and diafiltration membrane with a smaller pore size, operating the membrane at lower temperatures and employing fewer volumes of diafiltration medium.

The acidified, optionally concentrated and optionally diafiltered clear aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The acidified, optionally concentrated and optionally diafiltered clear aqueous soy protein solution then may be dried by any convenient technique, such as spray drying or freeze drying. The dry soy protein product has a protein content of at least about 60 wt % (N×6.25) d.b., preferably in excess of about 90 wt % (N×6.25) d.b., more preferably at least about 100 wt % (N×6.25) d.b. The soy protein product is low in phytic acid content, generally less than about 1.5% by weight.

In accordance with another aspect of the current invention, the protein precipitated upon dilution into water may be processed together with the supernatant. In such a case, the degree of dilution is generally about 1 to 25 fold, preferably about 3 to about 12 fold. The water with which the concentrated protein solution is mixed has a temperature of about 1° to about 60° C., preferably about 15° C. to about 35° C.

The dilution water, containing the deposited protein precipitate, is adjusted in pH to about 1.5 to about 4.4, preferably about 2.0 to about 4.0, using any convenient acid, such as hydrochloric acid or phosphoric acid. The drop in pH causes the resolubilization of the protein deposited by dilution yielding a clear, acidified protein solution. The protein solution may be used in the wet form or may be dried, by any convenient technique, such as spray drying or freeze drying, to a dry form.

As a further alternative, the protein solution formed by acidifying the mixture of protein precipitate and supernatant may be processed utilizing the same steps as described above for the isolated precipitate resolubilized by acidification.

The optionally concentrated, optionally diafiltered, optionally heat treated, optional adsorbent treated clear aqueous soy protein solution then may be dried by any convenient technique, such as spray drying or freeze drying. The dry soy protein product has a protein content in excess of about 60 wt % protein, preferably at least about 90 wt %, more preferably about 100 wt % (N×6.25) d.b.

The initial step of the process of providing the soy protein product according to the procedure described in copending U.S. patent application Ser. No. 12/693,714 also involves solubilizing soy protein from a soy protein source. The soy protein source again may be soybeans or any soy product or by-product derived from the processing of soybeans including but not limited to soy meal, soy flakes, soy grits and soy flour. The soy protein source may be used in the full fat form, partially defatted form or fully defatted form. Where the soy protein source contains an appreciable amount of fat, an oil-removal step generally is required during the process. The soy protein recovered from the soy protein source may be the protein naturally occurring in soybean or the proteinaceous material may be a protein modified by genetic manipulation but possessing characteristic hydrophobic and polar properties of the natural protein Protein solubilization may be effected by using a food grade sodium salt solution such as a solution of food grade sodium chloride. Where the soy protein product is intended for non-food uses, non-food-grade chemicals may be used. Other monovalent salts also may be used, such as potassium chloride. As the concentration of the salt solution increases, the degree of solubilization of protein from the soy protein source initially increases until a maximum value is achieved. Any subsequent increase in salt concentration does not increase the total protein solubilized. The concentration of the salt solution which causes maximum protein solubilization varies depending on the salt concerned. The choice of concentration of the sodium salt solution is also influenced by the proportion of protein desired to be obtained by the micellar route. Higher salt concentrations, preferably about 0.5 M to about 1.0 M, generally result in more protein micellar mass upon dilution of the concentrated soy protein solution into cold water. The extraction may be carried out with a sodium chloride solution of higher concentration, or alternatively, the extraction can be carried out with a solution of less than 0.5 M sodium chloride, for example, 0.10 M or 0.15 M sodium chloride, and then additional salt may be added to the soy protein solution after removal of the soy protein source.

In a batch process, the salt solubilization of the protein is effected at a temperature of from about 1° C. to about 100° C., preferably about 15° C. to about 35° C., preferably accompanied by agitation to decrease the solubilization time, which is usually about 1 to about 60 minutes. It is preferred to effect the solubilization to extract substantially as much protein from the soy protein source as is practicable, so as to provide an overall high product yield.

In a continuous process, the extraction of the protein from the soy protein source is carried out in any manner consistent with effecting a continuous extraction of protein from the soy protein source. In one embodiment, the soy protein source is continuously mixed with a food grade salt solution and the mixture is conveyed through a pipe or conduit having a length and at a flow rate for a residence time sufficient to effect the desired extraction in accordance with the parameters described herein. In such continuous procedure, the salt solubilization step is effected rapidly, in a time of up to about 10 minutes, preferably to effect solubilization to extract substantially as much protein from the soy protein source as is practicable. The solubilization in the continuous procedure is effected at temperatures between about 1° C. and about 100° C., preferably between about 15° C. and about 35° C.

The extraction may be carried out at the natural pH of the soy protein source/salt solution system, generally about 5 to about 7. Alternatively, the pH of the extraction may be adjusted to any desired value within the range of about 5 to about 7 for use in the extraction step by the use of any convenient acid, usually hydrochloric acid, or alkali, usually sodium hydroxide, as required.

The concentration of the soy protein source in the food grade salt solution during the solubilization step may vary widely. Typical concentration values are about 5 to about 15% w/v.

The protein extraction step with the aqueous salt solution has the additional effect of solubilizing fats which may be present in the soy protein source, which then results in the fats being present in the aqueous phase.

The protein solution resulting from the extraction step generally has a protein concentration of about 5 to about 50 g/L, preferably about 10 to about 50 g/L.

The aqueous salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit the oxidation of any phenolics in the protein solution.

The aqueous phase resulting from the extraction step then may be separated from the residual soy protein source, in any convenient manner, such as by employing a decanter centrifuge or any suitable sieve, followed by disc centrifugation and/or filtration to remove residual soy protein source material. The separated residual soy protein source may be dried for disposal. Alternatively, the separated residual soy protein source may be processed to recover some residual protein. The separated residual soy protein source may be re-extracted with fresh sodium salt solution and the protein solution yielded upon clarification combined with the initial protein solution for further processing as described below. Alternatively, the separated residual soy protein source may be processed by a conventional isoelectric precipitation procedure or any other convenient procedure to recover such residual protein.

Where the soy protein source contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution. Alternatively, defatting of the separated aqueous protein solution may be achieved by any other convenient procedure.

The aqueous soy protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% w/v, preferably about 0.05% to about 2% w/v, is employed. The adsorbing agent may be removed from the soy protein solution by any convenient means, such as by filtration.

As an alternative to extracting the soy protein source with an aqueous salt solution, such extraction may be made using water alone. Where such alternative is employed, then the salt, in the concentrations discussed above, may be added to the protein solution after separation from the residual soy protein source. When a first fat removal step is carried out, the salt generally is added after completion of such operations.

Another alternative procedure is to extract the soy protein source with the food grade salt solution at a relatively high pH value above about 7, generally up to about 11. The pH of the extraction system may be adjusted to the desired alkaline value by the use of any convenient food-grade alkali, such as aqueous sodium hydroxide solution. Alternatively, the soy protein source may be extracted with the salt solution at a relatively low pH below about pH 5, generally down to about pH 3. The pH of the extraction system may be adjusted to the desired acidic value by the use of any convenient food grade acid such as hydrochloric or phosphoric acid. Where such alternative is employed, the aqueous phase resulting from the soy protein source extraction step then is separated from the residual soy protein source, in any convenient manner, such as by employing decanter centrifugation, followed by disc centrifugation and/or filtration to remove residual soy protein source. The separated residual soy protein source may be dried for disposal or further processed to recover residual protein, as discussed above.

The aqueous soy protein solution resulting from the high or low pH extraction step then is pH adjusted to the range of about 5 to about 7, as discussed above, prior to further processing as discussed below. Such pH adjustment may be effected using any convenient acid, such as hydrochloric acid, or alkali, such as sodium hydroxide, as appropriate. If necessary, the protein solution may be clarified by any convenient procedure such as centrifugation or filtration after the pH adjustment and prior to further processing.

The aqueous soy protein solution may be concentrated to increase the protein concentration thereof while maintaining the ionic strength thereof substantially constant. Such concentration generally is effected to provide a concentrated protein solution having a protein concentration of about 50 g/L to about 400 g/L, preferably about 100 to about 250

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 1,000,000 Daltons, preferably about 5,000 to about 100,000 Daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass through the membrane while preventing higher molecular weight species from so doing. The low molecular weight species include not only the ionic species of the food grade salt but also low molecular weight materials extracted from the source material, such as, carbohydrates, pigments, low molecular weight proteins and anti-nutritional factors, such as trypsin inhibitors, which are themselves low molecular weight proteins. The molecular weight cut-off of the membrane is usually chosen to ensure retention of a significant proportion of the protein in the solution, while permitting contaminants to pass through having regard to the different membrane materials and configurations.

The protein solution may be subjected to a diafiltration step, before or after complete concentration, preferably using an aqueous salt solution of the same molarity and pH as the extraction solution. Diafiltration may be effected using from about 1 to about 40 volumes of diafiltration solution, preferably about 2 to about 25 volumes of diafiltration solution. In the diafiltration operation, further quantities of contaminants are removed from the aqueous protein solution by passage through the membrane with the permeate. The diafiltration operation may be effected until no significant further quantities of contaminants or visible colour are present in the permeate. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The concentration step and the optional diafiltration step may be effected at any convenient temperature, generally about 2° to about 65° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

There are two main trypsin inhibitors in soy, namely the Kunitz inhibitor, which is a heat-labile molecule with a molecular weight of approximately 21,000 Daltons, and the Bowman-Birk inhibitor, a more heat-stable molecule with a molecular weight of about 8,000 Daltons. The level of trypsin inhibitor activity in the final soy protein isolate can be controlled by manipulation of various process variables.

For example, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to about 1,000,000 Da, operating the membrane at elevated temperatures, such as about 30 to about 65° C. and employing greater volumes of diafiltration medium, such as about 10 to about 40 volumes.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the concentrated protein solution before or after diafiltration or may be dry blended with the dried soy protein product. The addition of the reducing agent may be combined with the membrane processing steps, as described above.

If it is desired to retain active trypsin inhibitors in the concentrated protein solution, this can be achieved by utilizing a concentration and diafiltration membrane with a smaller pore size, operating the membrane at lower temperatures, employing fewer volumes of diafiltration medium and not employing a reducing agent The concentrated and optionally diafiltered protein solution may be subject to a further defatting operation, if required, as described in U.S. Pat. Nos. 5,844,086 and 6,005,076. Alternatively, defatting of the concentrated and optionally diafiltered protein solution may be achieved by any other convenient procedure.

The concentrated and diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered soy protein solution resulting from the optional defatting and optional adsorbent treatment step may be subjected to a pasteurization step to reduce the microbial load. Such pasteurization may be effected under any desired pasteurization conditions. Generally, the concentrated and optionally diafiltered protein solution is heated to a temperature of about 55° to about 70° C., preferably about 60° to about 65° C., for about 30 seconds to about 60 minutes, preferably about 10 minutes to about 15 minutes. The pasteurized, concentrated protein solution then may be cooled for further processing as described below, preferably to a temperature of about 25° to about 40° C.

The concentrated and optionally diafiltered protein solution may be raised in ionic strength by salt addition, if desired, to promote the formation of protein micellar mass upon dilution as an alternative to the ionic strength adjustment operation described above.

Depending on the temperature employed in the concentration step and optional diafiltration step and whether or not a pasteurization step is effected, the concentrated protein solution may be warmed to a temperature of at least about 20° C., and up to about 60° C., preferably about 25° C. to about 40° C., to decrease the viscosity of the concentrated protein solution to facilitate performance of the subsequent dilution step and micelle formation. The concentrated protein solution should not be heated beyond a temperature above which micelle formation does not occur on dilution by chilled water.

The concentrated protein solution resulting from the concentration step, optional diafiltration step, optional ionic strength adjustment step, optional defatting step, optional adsorbent treatment step and optional pasteurization step, then is diluted to effect micelle formation by mixing the concentrated protein solution with chilled water having the volume required to achieve the degree of dilution desired. Depending on the proportion of soy protein desired to be obtained by the micelle route and the proportion from the supernatant, the degree of dilution of the concentrated protein solution may be varied. With lower dilution levels, in general, a greater proportion of the soy protein remains in the aqueous phase.

When it is desired to provide the greatest proportion of the protein by the micelle route, the concentrated protein solution is diluted by about 5 fold to about 25 fold, preferably by about 10 fold to about 20 fold.

The chilled water with which the concentrated protein solution is mixed has a temperature of less than about 15° C., generally about 1° to about 15° C., preferably less than about 10° C., since improved yields of protein isolate in the form of protein micellar mass are attained with these colder temperatures at the dilution factors used.

In a batch operation, the batch of concentrated protein solution is added to a static body of chilled water having the desired volume, as discussed above. The dilution of the concentrated protein solution and consequential decrease in ionic strength causes the formation of a cloud-like mass of highly associated protein molecules in the form of discrete protein droplets in micellar form. In the batch procedure, the protein micelles are allowed to settle in the body of chilled water to form an aggregated, coalesced, dense, amorphous sticky gluten-like protein micellar mass (PMM). The settling may be assisted, such as by centrifugation. Such induced settling decreases the liquid content of the protein micellar mass, thereby decreasing the moisture content generally from about 70% by weight to about 95% by weight to a value of generally about 50% by weight to about 80% by weight of the total micellar mass. Decreasing the moisture content of the micellar mass in this way also decreases the occluded salt content of the micellar mass, and hence the salt content of the dried protein product.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution of the concentrated protein solution.

The mixing of the concentrated protein solution and the diluting water in the pipe initiates the formation of protein micelles and the mixture is continuously fed from the outlet of the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein micelles are allowed to settle in the settling vessel to form an aggregated, coalesced, dense, amorphous, sticky, gluten-like protein micellar mass (PMM) and the procedure is continued until a desired quantity of the PMM has accumulated in the bottom of the settling vessel, whereupon the accumulated PMM is removed from the settling vessel. In lieu of settling by sedimentation, the PMM may be separated continuously by centrifugation.

By the utilization of a continuous process for the recovery of soy protein micellar mass as compared to the batch process, the initial protein extraction step can be significantly reduced in time for the same level of protein extraction and significantly higher temperatures can be employed in the extraction step. In addition, in a continuous operation, there is less chance of contamination than in a batch procedure, leading to higher product quality and the process can be carried out in more compact equipment.

The settled micellar mass is separated from the residual aqueous phase or supernatant, such as by decantation of the residual aqueous phase from the settled mass or by centrifugation. The PMM may be used in the wet form or may be dried, by any convenient technique, such as spray drying or freeze drying, to a dry form. The dry PMM has a high protein content, in excess of about 90 wt % protein, preferably at least about 100 wt % protein (calculated as N×6.25) d.b., and is substantially undenatured. Alternatively, the wet PMM may be adjusted in pH to a pH of about 2.0 to about 4.0, preferably about 2.9 to about 3.2. The pH adjustment may be effected in any convenient manner, such as by addition of hydrochloric acid or phosphoric acid. The resulting acidified soy protein solution then is dried. As a further alternative, the pH-adjusted soy protein solution may be subjected to a heat treatment to inactivate heat labile anti-nutritional factors, such as the trypsin inhibitors mentioned above. Such a heating step also provides the additional benefit of reducing the microbial load. Generally, the protein solution is heated to a temperature of about 70° to about 100° C., preferably about 85° to about 95° C., for about 10 seconds to about 60 minutes, preferably about 30 seconds to about 5 minutes. The heat treated acidified soy protein solution then may be cooled to a temperature of about 2° C. to about 60° C., preferably about 20° to about 35° C. The resulting acidified, heat treated soy protein solution then is dried.

In accordance with the invention claimed in U.S. application Ser. No. 12/693,714, a calcium salt or other divalent salt, preferably calcium chloride is added to the supernatant, which may first be concentrated or partially concentrated in the manner described below, to provide a conductivity of about 2 mS to about 30 mS, preferably 8 mS to about 15 mS. The calcium chloride added to the supernatant may be in any desired form, such as a concentrated aqueous solution thereof.

The addition of the calcium chloride has the effect of depositing phytic acid from the supernatant in the form of calcium phytate. The deposited phytate is recovered from the supernatant, such as by centrifugation and/or filtration to leave a clear solution.

The pH of the clear solution then may be adjusted to a value of about 1.5 to about 4.4, preferably about 2.0 to about 4.0. The pH adjustment may be effected in any convenient manner, such as by the addition of hydrochloric acid or phosphoric acid. If desired, the acidification step may be omitted from the various options described herein (other than the heat treatment mentioned below), once the precipitated phytate material has been removed.

The pH-adjusted clear acidified aqueous soy protein solution may be subjected to a heat treatment to inactivate heat labile anti-nutritional factors, such as the trypsin inhibitors mentioned above. Such a heating step also provides the additional benefit of reducing the microbial load. Generally, the protein solution is heated to a temperature of about 70° to about 160° C., for about 10 seconds to about 60 minutes, preferably about 80° to about 120° C., for about 10 seconds to about 5 minutes, more preferably about 85° to about 95° C., for about 30 seconds to about 5 minutes. The heat treated acidified soy protein solution then may be cooled for further processing as described below, to a temperature of about 2° C. to about 60° C., preferably about 20° to about 35° C.

The optionally pH-adjusted and optionally heat treated clear solution, if not already concentrated, is concentrated to increase the protein concentration thereof. Such concentration is effected using any convenient selective membrane technique, such as ultrafiltration or diafiltration, using membranes with a suitable molecular weight cut-off permitting low molecular weight species, including salt, carbohydrates, pigments, trypsin inhibitors and other low molecular weight materials extracted from the protein source material, to pass through the membrane, while retaining a significant proportion of the soy protein in the solution. Ultrafiltration membranes having a molecular weight cut-off of about 3,000 to 1,000,000 Daltons, preferably about 5,000 to about 100,000 Daltons, having regard to differing membrane materials and configuration, may be used. Concentration of the protein solution in this way also reduces the volume of liquid required to be dried to recover the protein. The protein solution generally is concentrated to a protein concentration of about 50 g/L to about 400 g/L, preferably about 100 to about 250 g/L, prior to drying. Such concentration operation may be carried out in a batch mode or in a continuous operation, as described above.

Where the supernatant is partially concentrated prior to the addition of the calcium salt and fully concentrated after removal of the precipitate, the supernatant is first concentrated to a protein concentration of about 50 g/L or less, and, after removal of the precipitate, then is concentrated to a protein concentration of about 50 to about 400 g/L, preferably about 100 to about 250 g/L.

The protein solution may be subjected to a diafiltration step, before or after partial or complete concentration, preferably using water or a dilute saline solution. The diafiltration solution may be at its natural pH, a pH equal to that of the protein solution being diafiltered or any pH in between. Such diafiltration may be effected using from about 1 to about 40 volumes of diafiltration solution, preferably about 2 to about 25 volumes of diafiltration solution. In the diafiltration operation, further quantities of contaminants are removed from the aqueous solution by passage through the membrane with the permeate. The diafiltration operation may be effected until no significant further quantities of contaminants or visible colour are present in the permeate or until the protein solution has been sufficiently purified. Such diafiltration may be effected using the same membrane as for the concentration step. However, if desired, the diafiltration may be effected using a separate membrane, such as a membrane having a molecular weight cut-off in the range of about 3,000 to about 1,000,000 Daltons, preferably about 5,000 to about 100,000 Daltons, having regard to different membrane materials and configuration.

The concentration step and the diafiltration step may be effected herein in such a manner that the soy protein product subsequently recovered by drying the concentrated and diafiltered retentate contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein isolate solution.

The concentration step and the diafiltration step may be effected at any convenient temperature, generally about 2° to about 60° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

As mentioned above, the level of trypsin inhibitor activity in the final soy protein product can be controlled by manipulation of various process variables.

As previously noted, heat treatment of the acidified aqueous soy protein solution may be used to inactivate heat-labile trypsin inhibitors. The partially concentrated or fully concentrated acidified soy protein solution may also be heat treated to inactivate heat labile trypsin inhibitors.

In addition, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to 1,000,000 Da, operating the membrane at elevated temperatures, such as about 30 to about 60° C. and employing greater volumes of diafiltration medium, such as about 10 to about 40 volumes.

Acidifying and membrane processing the diluted protein solution at a lower pH, such as about 1.5 to about 3 may reduce the trypsin inhibitor activity relative to processing the solution at a higher pH, such as about 3 to about 4.4. When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the diafiltered retentate before dilution, may be added to the supernatant, may be added to the concentrated and diafiltered calcium modified supernatant before drying or may be dry blended with the dried soy protein product. The addition of the reducing agent may be combined with a heat treatment step and the membrane processing steps, as described above.

If it is desired to retain active trypsin inhibitors in the concentrated protein solution, this can be achieved by eliminating or reducing the intensity of the heat treatment step, not utilizing reducing agents, operating the concentration and diafiltration steps at the higher end of the pH range, such as about 3 to about 4.4, utilizing a concentration and diafiltration membrane with a smaller pore size, operating the membrane at lower temperatures and employing fewer volumes of diafiltration medium.

The concentrated and diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The pH of the concentrated and optionally diafiltered and optionally adsorbent treated protein solution may be adjusted to about 2.0 to about 4.0, if a pH adjustment step has not already been employed. The pH-adjusted, concentrated and optionally diafiltered and optionally adsorbent treated protein solution may also be heat treated to reduce the level of trypsin inhibitor activity as described above.

The concentrated and optionally diafiltered and optionally adsorbent treated protein solution is dried by any convenient technique, such as spray drying or freeze drying, to a dry form. The dried soy protein product has a protein content of at least about 60 wt % (N×6.25) d.b., preferably in excess of about 90 wt % (N×6.25) d.b., more preferably at least about 100 wt %. The soy protein product is low in phytic acid content, generally less than about 1.5% by weight.

A variety of procedures may be used to provide soy protein products, preferably isolates, in accordance with the present invention from the products produced in accordance with U.S. application Ser. Nos. 12/704,078, 12/703,996 and 12/693,714. In one such procedure, the concentrated soy protein solution obtained as described above and in the aforementioned U.S. patent application Ser. No. 12/704,078 may be heat treated to deposit protein. The entire heat treated sample may be dried to form the soy protein product or optionally the insoluble solids may be recovered and dried to form the soy protein product. Alternatively, the dried concentrated protein solution may be re-suspended in water, the pH adjusted to about 6 if the product had been acidified before drying, and then heat treated with the entire sample then dried or the insoluble solids subsequently collected and dried. As a further alternative, the initial soy protein solution arising from the extraction and separation steps may be heat treated to deposit protein, with the entire sample subsequently dried or the precipitated protein recovered and dried.

In another alternative procedure, the dried protein precipitate obtained according to U.S. patent application Ser. No. 12/703,996 may be re-suspended in water, the pH-adjusted to about 6 if the product had been acidified before drying, and a heat treatment applied. The entire sample may be dried to form the soy protein product or optionally the insoluble solids may be recovered and dried to form the soy protein product. Alternatively, the wet protein precipitate, prior to the drying step may be re-suspended in water and heat treated with the entire sample dried or the insoluble solids subsequently recovered and dried.

In an additional alternative procedure, the dried acid soy protein product obtained as described in the aforementioned U.S. patent application Ser. No. 12/693,714 may be formed into an aqueous solution, the pH of the aqueous solution raised to about pH 6 to precipitate the soy protein and the sample dried. Alternatively, the protein precipitated by the pH adjustment may be recovered and dried. The pH 6 solution may also be heated prior to drying the entire sample or recovering and drying the precipitated protein. As a further alternative the concentrated acidic protein solution, prior to drying may be raised in pH to about 6 to precipitate the soy protein, which may be recovered and dried to form the soy protein product or else the entire sample may be dried to form the product. The pH-adjusted concentrated protein solution may also be heat treated prior to drying or the recovery and drying of the precipitated protein.

In yet another alternative procedure, the soy protein product may be produced by extracting a soy protein source material with an aqueous sodium chloride solution to cause solubilization of soy protein from the protein source and to form an aqueous soy protein solution, separating the aqueous soy protein solution from residual soy protein source, adjusting the pH of the soy protein solution to about 4.5 to cause precipitation of soy protein, recovering the precipitated soy protein and drying it to form the soy protein product. Alternatively, a heat treatment may be applied after the pH adjustment step and prior to the recovery and drying of the precipitated protein. As a further alternative, the pH of the recovered protein precipitate may be raised to about 6 using any convenient food grade alkali prior to drying.

In any of the aforementioned procedures in which precipitated protein is collected and dried, the remaining soluble fraction may also be processed to form a soy protein product. The soluble fraction may be dried directly or may be further processed by membrane concentration and/or diafiltration and/or heat treatment prior to drying.

The heat treatment effected on the soy protein solutions and referred to above may be effected by heating the solution to a temperature of about 70° to about 160° C. for about 2 seconds to about 60 minutes, preferably about 80° to about 120° C. for about 15 seconds to about 15 minutes, more preferably about 85° to about 95° C. to about 1 to about 5 minutes.

EXAMPLES

In the Examples which follow, all freeze dried products were ground to a powder, the protein content of the powders was determined by a combustion method using a LECO Nitrogen Determinator and the moisture content of the powders was determined by an oven drying method.

The water binding capacity of the products was determined by the following procedure. Protein powder (1 g) was weighed into centrifuge tubes (50 ml) of known weight. To this powder was added approximately 20 ml of reverse osmosis purified (RO) water at the natural pH. The contents of the tubes were mixed using a vortex mixer at moderate speed for 1 minute. The samples were incubated at room temperature for 4 minutes then mixed with the vortex for 30 seconds. This was followed by incubation at room temperature for 4.5 minutes then another 30 seconds of vortex mixing. The samples were then centrifuged at 1,000 g for 15 minutes at 20° C. After centrifugation, the supernatant was carefully poured off, ensuring that all solid material remained in the tube. The centrifuge tube was then re-weighed and the weight of water saturated sample was determined.

Water binding capacity (WBC) was calculated as:

WBC (ml/g)=(mass of water saturated sample−mass of initial sample)/(mass of initial sample×total solids content of sample)

Sensory evaluation of samples was performed as follows.

An informal panel of 4 to 6 panelists was asked to blindly compare the experimental sample to a sample of S013-K19-09A conventional IEP pH 6 product, prepared as described in Example 1 below, and indicate which sample had more beany flavour. Samples were prepared for sensory evaluation as 2% protein w/v dispersions in purified drinking water, with the pH of the samples matched by adding food grade sodium hydroxide solution to the sample initially having the lower pH.

Example 1

This Example illustrates the preparation of a soy protein isolate by conventional isoelectric precipitation.

30 kg of soy white flake was added to 300 L of RO water at ambient temperature and the pH-adjusted to 8.5 by the addition of 1M sodium hydroxide solution. The sample was agitated for 30 minutes to provide an aqueous protein solution. The pH of the extraction was monitored and maintained at 8.5 throughout the 30 minutes. The residual soy white flake was removed and the resulting protein solution clarified by centrifugation and filtration to produce 278.7 L of filtered protein solution having a protein content of 2.93% by weight. The pH of the protein solution was adjusted to 4.5 by the addition of HCl that had been diluted with an equal volume of water and a precipitate formed. The precipitate was collected by centrifugation then washed by re-suspending it in 2 volumes of RO water. The washed precipitate was then collected by centrifugation. A total of 32.42 kg of washed precipitate was obtained with a protein content of 18.15 wt %. This represented a yield of 72.0% of the protein in the clarified extract solution. An aliquot of 16.64 kg of the washed precipitate was combined with an equal weight of RO water and then the pH of the sample adjusted to 6 with sodium hydroxide. The pH-adjusted sample was then spray dried to yield an isolate with a protein content of 93.80% (N×6.25) d.b. The product was designated S013-K19-09A conventional IEP pH 6.

Example 2

This Example illustrates the preparation of a modified soy protein product from S702.

20 kg of defatted, minimally heat processed soy flour was added to 200 L of 0.15 M CaCl$_2$ solution at ambient temperature and agitated for 30 minutes to provide an aqueous protein solution. The residual soy flour was removed and the resulting protein solution was clarified by centrifugation and filtration to produce 169 L of filtered protein solution having a protein content of 1.68% by weight.

The filtered protein extract solution was reduced in volume to 31 L by concentration on a PVDF membrane having a molecular weight cutoff of 5,000 Daltons. The concentrated protein solution was diafiltered with 62 L of 0.075M CaCl$_2$. The resulting diafiltered, concentrated protein solution had a protein content of 13.28% by weight and represented a yield of 95.2 wt % of the initial filtered protein solution. The diafiltered, concentrated protein solution was then dried to yield a product found to have a protein content of 91.45% (N×6.25) d.b. The product was termed S005-L11-08A S702.

The S005-L11-08A S702 soy protein isolate was suspended in water at a level of about 8 wt % protein. Half the sample was freeze dried to serve as a control for water binding capacity (WBC) testing. The other half of the sample was heated to approximately 118° C. for 15 minutes in a pressure cooker and then freeze dried. Results obtained on analysis of the S702-derived products are shown in Table 1 below.

TABLE 1

Results of the analysis of the S702 derived products

| Sample | wt obtained (g) | % moisture | % protein d.b. | WBC (ml/g) |
|---|---|---|---|---|
| Control | 21.45 | 4.29 | 92.76 | 0.90 |
| Heat treated | 8.00 | 5.01 | 106.68 | 3.68 |

As may be seen from the results in Table 1, addition of a heat treatment step increased the water binding capacity of the product.

All of the sensory panelists (6 of 6) evaluating the heat treated S702 rated this sample as less beany than the conventional IEP control, prepared as described in Example 1.

Example 3

This Example illustrates the provision of a soy protein product from a calcium chloride extraction of soy flour.

A 700 ml sample of filtrate from extraction of defatted, minimally heat processed soy flour with 0.15M CaCl$_2$ was heated to 85° C. for 5 minutes to form a precipitate. The solids were collected by centrifugation at 5,000 g for 5 minutes and then re-suspended in 700 ml of RO water to wash out contaminants. The suspension was then centrifuged again at 5,000 g for 5 minutes to collect the precipitate. The wash procedure was carried out once more and the collected precipitate was then freeze dried.

The analytical results for the product are shown in Table 2.

TABLE 2

Results of the analysis of the product formed by heat treating CaCl$_2$ extract

| sample | wt obtained (g) | % moisture | % protein d.b. | WBC (ml/g) |
|---|---|---|---|---|
| HT CaCl$_2$ extract ppt | 5.56 | 4.44 | 80.57 | 3.25 |

Three out four sensory panelists felt that the precipitate formed by heating the calcium chloride extract was less beany than the IEP control, prepared as described in Example 1.

Example 4

This Example illustrates the production of a modified soy protein product from S7300.

40 kg of soy white flake was added to 400 L of 0.15 M CaCl$_2$ solution at ambient temperature and agitated for 30 minutes to provide an aqueous protein solution. The residual soy protein source was removed and the resulting protein solution was clarified by centrifugation and filtration to produce 330 L of filtered protein solution having a protein content of 2.38% by weight.

330 L of the protein extract solution was reduced to 67 L on a PES membrane having a molecular weight cutoff of 100,000 Daltons, producing a concentrated protein solution with a protein content of 9.74% by weight. The concentrated protein solution was then diafiltered with 335 L of 0.15M CaCl$_2$ solution on the same membrane used for the initial concentration step. The diafiltered protein solution was then further concentrated to 23.2 kg on the same membrane used for the initial concentration and diafiltration steps, producing a concentrated protein solution with a protein content of 23.7 wt %.

22.7 kg of the concentrated and diafiltered protein solution at 30° C. was then diluted 1:15 into reverse osmosis (RO) purified water having a temperature of 13° C. A white cloud formed immediately. The supernatant was removed by centrifugation and the precipitated protein was recovered in a yield of 53.6 wt % of the filtered protein solution. The recovered 10.7 kg of protein precipitate was then washed with about 2 volumes of water and the water decanted. A small sample of the washed precipitate (217.06 g) was retained and stored overnight in the refrigerator, while the remainder of the material was resolubilized in about 1.7 volumes of water with diluted HCl added to adjust the pH of the sample to 3. The acidified and re-solubilized precipitate was spray dried to form S013/15-K30-09A 57300, which had a protein content of 100.73% (N×6.25) d.b.

The next morning the cold, washed precipitate sample was combined with RO water (217 g) and the mixture blended in a Robot Coupe food processor with a steel knife insert in order to reduce the size of the protein particles. The sample was processed for approximately 2 minutes which did reduce the size of the protein particles but also introduced some foam. An aliquot of the processed sample (62.98 g) was freeze dried to serve as a control in water binding capacity testing. The remainder of the sample was heated to 90° C. for 5 minutes over boiling water then immediately cooled to room temperature in an ice bath. The cooled sample was then freeze dried.

Results of the analysis of the 57300 derived products are shown in Table 3.

TABLE 3

Results of the analysis of the S7300 derived products

| sample | wt obtained (g) | % moisture | % protein d.b. | WBC (ml/g) |
|---|---|---|---|---|
| Control | 11.90 | 1.58 | 104.42 | 1.68 |
| Heat treated | 65.52 | 1.38 | 105.96 | 3.14 |

As may be seen from the results in Table 3, heat treatment appeared to increase the water binding capacity of the protein.

In sensory testing, the majority of panelists (5 of 6) felt that the heat treated S7300 was less beany than the conventional IEP control, prepared as described in Example 1.

Example 5

This Example illustrates the preparation of modified soy protein products from S200Ca.

10 kg of defatted, minimally heat processed soy flour was added to 200 L of 0.50 M NaCl solution at ambient temperature and agitated for 60 minutes to provide an aqueous protein solution. The residual soy flour was removed and the resulting protein solution was clarified by centrifugation and filtration to produce 165 L of filtered protein solution having a protein content of 1.34% by weight.

The protein extract solution was reduced to 12.06 kg by concentration on a PES membrane having a molecular weight cutoff of 100,000 Daltons producing a concentrated protein solution with a protein content of 17.51% by weight.

The concentrated protein solution at 30° C. was then diluted 1:5 into cold RO water having a temperature of 4° C. A white cloud formed immediately. The supernatant was removed and the precipitated, viscous, sticky mass (PMM) was recovered by centrifugation in a yield of 20.8 wt % of the filtered protein solution. The dried PMM derived protein was found to have a protein content of 99.66% (N×6.25) d.b. The product was given a designation S005-K19-08A 5300.

To 65 L of the isolated supernatant was added 0.336 kg of CaCl$_2$, which raised the conductivity of the solution from 6.31 mS to 12.65 mS. A precipitate formed and was removed by centrifugation and then the pH of the centrate adjusted to 3 with diluted HCl. The acidified centrate was concentrated from a volume of 66 L to a volume of 5 L on a PES membrane with a molecular weight cut-off of 10,000 Daltons. The concentrate was then diafiltered on the same membrane with 25 L of reverse osmosis purified water adjusted to pH 3 with diluted HCl. With the additional protein recovered from the supernatant, the overall recovery of the filtered protein solution was 37.1%. The diafiltered retentate was dried to produce a product with a protein content of 98.01% (N×6.25) d.b. The product was given the designation S005-K19-08A S200Ca.

An approximately 8% solution of S005-K19-08A S200Ca was prepared in RO water (600 ml). An aliquot of the protein solution (50 ml) was raised in pH from 3.24 to 6.00 with 25% w/w NaOH (FCC grade) and then freeze dried. The dry product was termed S200Ca-a. The remaining portion of the protein solution was split in half. One half was raised in pH to 6.00 with 25% w/w sodium hydroxide (FCC grade) then centrifuged at 10,200 g for 10 minutes. The supernatant was discarded and the precipitate freeze dried to form a product termed S200Ca-b. The other half of the sample was raised in pH to 6.00 with 25% w/w sodium hydroxide FCC grade then heated to 90° C. for 5 minutes over boiling water. The sample was immediately cooled to room temperature in ice water then centrifuged at 10,200 g for 10 minutes. The supernatant was discarded and the precipitate freeze dried to form a product called S200Ca-c.

Results of the analysis of the S200Ca derived products are shown in Table 4.

TABLE 4

Results of the analysis of the S200Ca derived products

| Sample | Wt obtained (g) | % moisture | % protein d.b. | WBC (ml/g) |
|---|---|---|---|---|
| S200Ca-a | 3.53 | 6.74 | 95.94 | 1.92 |
| S200Ca-b | 8.91 | 5.96 | 99.66 | 3.30 |
| S200Ca-c | 13.37 | 7.35 | 99.73 | 5.20 |

As may be seen from the results in Table 4, the fractionation step and the subsequent heat treatment step both increased the water binding capacity of the isolate.

Both S200Ca-b and S200Ca-c were found by the sensory panel to be less beany than the IEP control product, prepared as described in Example 1. The S200Ca-b was identified as less beany than the control by 4 out of 5 panelists, while the S200Ca-c was identified as less beany than the control by 4 out of 6 panelists.

Example 6

This Example illustrates the provision of a soy protein product from sodium chloride extracted soy flour.

120 g of defatted, minimally heat processed soy flour was extracted with 1200 ml of 0.15M NaCl for 30 minutes at room temperature. The extract was separated from the spent flour by centrifugation at 10,000 g for 10 minutes. The pH of the centrate was adjusted to 4.5 with diluted HCl, which induced the formation of precipitate. The sample was then centrifuged at 10,000 g to collect the solids which were freeze dried.

The analytical results for this sample are shown in Table 5 below.

TABLE 5

Results of the analysis of the product prepared from NaCl extract

| Sample | wt obtained (g) | % moisture | % protein d.b. | WBC (ml/g) |
|---|---|---|---|---|
| NaCl-ppt | 15.29 | 1.15 | 100.09 | 1.66 |

In sensory testing, the majority of panelists (3 of 5) felt that the NaCl-ppt product was less beany than the conventional IEP control, prepared as described in Example 1.

Another trial was then conducted where 120 g of soy white flake was extracted with 1200 ml of 0.15M NaCl for 30 minutes at room temperature. The extract was separated from the spent flour by centrifugation at 6,500 g for 10 minutes. The centrate was further clarified by filtration through a set of #3 filter pads pre-wetted with 0.15M NaCl. The pH of the filtrate was adjusted to 4.5 with diluted HCl, which induced the formation of precipitate. The sample was allowed to rest for 10 minutes and then centrifuged at 6,500 g for 10 minutes to collect the solids. The solids were re-suspended in 1000 ml of RO water then the sample centrifuged again at 6,500 g for 10 minutes. The precipitate was then washed and re-collected once more as above. The washed precipitate was resuspended in 400 ml of RO water and the sample heated to 85° C. for 5 minutes then rapidly cooled to room temperature in ice water. The entire sample was then freeze dried.

The analytical results for this heat treated sample are shown in Table 6.

TABLE 6

Results of the analysis of the heat treated product from NaCl extract

| Sample | wt obtained (g) | % moisture | % protein d.b. | WBC (ml/g) |
|---|---|---|---|---|
| HT NaCl-ppt | 7.33 | 9.80 | 101.60 | 3.60 |

As can be seen from the results in Table 6, the precipitate obtained in this second trial which included a heat treatment step had a higher water binding capacity than the precipitate from the previous trial.

Six out of six sensory panelists identified the heat treated product from the sodium chloride extract as being less beany than the control isoelectric precipitate product, prepared as described in Example 1.

Example 7

This Example contains an evaluation of the solubility in water of the soy protein isolates produced by the methods of Examples 1, 2, 4, 5, and 6. Protein solubility was evaluated using a modified version of the procedure of Mon et al., J. Food Sci. 50:1715-1718.

Sufficient protein powder to supply 'a' g of protein was weighed into a beaker and then a small amount of reverse osmosis (RO) purified water was added and the mixture stirred until a smooth paste formed. Additional water was then added to bring the volume to approximately 'b' ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH, 'c'. For the pH-adjusted samples, the pH was measured and corrected periodically during the 60 minutes stirring. After the 60 minutes of stirring, the samples were made up to 'd' ml total volume with RO water, yielding a 1% protein w/v dispersion. The protein content of the dispersions was measured by combustion analysis using a Leco instrument. Aliquots of the dispersions were then centrifuged at 7,800 g for 10 minutes, which sedimented insoluble material and yielded a clear supernatant. The protein content of the supernatant was measured by Leco analysis and the protein solubility of the product was then calculated as follows:
Solubility (%)=(% protein in supernatant/% protein in initial dispersion)×100

Parameters 'a' to 'd' are shown in the following Table 7:

TABLE 7

Parameters 'a' to 'd' for solubility testing in water at 1% protein w/v

| Product | 'a' | 'b' | 'c' | 'd' |
|---|---|---|---|---|
| Example 1, S013-K19-09A conventional IEP, pH 6 | 0.5 | 45 | 5.48 | 50 |
| Example 2, heat treated S005-L11-08A S702 | 0.4 | 35 | 6.42 | 40 |
| Example 4, heat treated S013/15-K30-09A S7300 | 0.5 | 45 | 6.36 | 50 |
| Example 5, S005-K19-08A S200Ca-b | 0.5 | 45 | 6.11 | 50 |
| Example 5, S005-K19-08A S200Ca-c | 0.5 | 45 | 6.61 | 50 |
| Example 6, NaCl-ppt | 0.5 | 45 | 3.97 | 50 |
| Example 6, heat treated NaCl-ppt | 0.3 | 25 | 3.82 | 30 |

The solubility results are set forth in the following Table 8.

TABLE 8

Solubility of products at different pH values

| product | Solubility (%) | | | | | | |
|---|---|---|---|---|---|---|---|
| | pH 2 | pH 3 | pH 4 | pH 5 | pH 6 | pH 7 | Nat. pH |
| Example 1, S013-K19-09A conventional IEP, pH 6 | 72.7 | 64.7 | 13.3 | 9.2 | 30.5 | 55.7 | 24.8 |
| Example 2, heat treated S005-L11-08A S702 | 11.0 | 7.7 | 4.7 | 4.2 | 6.3 | 9.3 | 8.5 |

TABLE 8-continued

Solubility of products at different pH values

| product | pH 2 | pH 3 | pH 4 | pH 5 | pH 6 | pH 7 | Nat. pH |
|---|---|---|---|---|---|---|---|
| Example 4, heat treated S013/15-K30-09A S7300 | 51.0 | 28.7 | 4.8 | 3.1 | 6.4 | 15.5 | 8.1 |
| Example 5, S005-K19-08A S200Ca-b | 100 | 99.0 | 35.0 | 16.5 | 19.0 | 30.9 | 17.0 |
| Example 5, S005-K19-08A S200Ca-c | 20.6 | 19.8 | 14.6 | 11.3 | 19.8 | 21.7 | 14.5 |
| Example 6, NaCl-ppt | 88.3 | 83.7 | 2.3 | 1.0 | 16.8 | 70.3 | 6.9 |
| Example 6, heat treated NaCl-ppt | 6.7 | 0.0 | 0.0 | 0.0 | 1.9 | 8.7 | 0.0 |

SUMMARY OF THE DISCLOSURE

In summary of the disclosure, the present invention provides a variety of procedures for forming soy protein products which can substitute for conventional soy protein isolates in a variety of food applications. Modifications are possible within the scope of the invention.

What we claim is:

1. A process of preparing a soy protein product having a protein content of at least about 60 wt % (N×6.25) on a dry weight basis, which comprises:
    (a) adding calcium salt or other divalent salt to supernatant from the precipitation of a soy protein micellar mass to provide conductivity of about 2 mS to about 30 mS,
    (b) removing precipitate from the resulting solution to leave a clear solution,
    (c) adjusting the pH of the clear solution to about 1.5 to about 4.4,
    (d) concentrating the pH-adjusted clear solution to a protein content of about 50 to about 400 g/L to provide a clear concentrated soy protein solution,
    (e) optionally diafiltering the clear concentrated protein solution, and (f) optionally drying the concentrated and optionally diafiltered solution, wherein:
    (A) the concentrated and optionally diafiltered solution is dried in step (f) and the dried soy protein product is formed into an aqueous solution, the pH of the aqueous solution is increased to about pH 6 to precipitate soy protein therefrom, the pH-adjusted material is optionally heat treated, and either (i) the entire pH-adjusted material is dried to provide the soy protein product or the precipitate is recovered from the pH-adjusted material and the recovered precipitate is dried to provide the soy protein product, or
    (B) the pH of the concentrated and optionally diafiltered solution in step (e) is increased to about 6 to precipitate the soy protein therefrom, the pH-adjusted material is optionally heat treated and either (i) the entire pH-adjusted material is dried to provide the soy protein material or (ii) the precipitate is recovered from the pH-adjusted material and the recovered precipitate is dried to provide the soy protein product.

2. The method of claim 1 wherein said heat treatment is effected at a temperature of about 70° to about 160° C. for about 2 seconds to about 60 minutes.

3. The method of claim 2 wherein said heat treatment is effected at a temperature of about 80° to about 120° C. for about 15 seconds to about 15 minutes.

4. The method of claim 3 wherein said heat treatment is effected at a temperature of about 85° to about 95° C. for about 1 to about 5 minutes.

5. The method of claim 1 wherein liquid phase resulting from recovery of precipitated soy protein from the optionally heat treated solution is either dried to provide a soy protein product or is further processed by membrane concentration and/or diafiltration and/or heat treated followed by drying to provide a soy protein product.

6. A method of producing a soy protein product having a soy protein content of at least 60 wt % (N×6.25), dry weight basis, which comprises:
    (a) extracting a soy protein source with an aqueous sodium chloride solution to cause solubilization of soy protein from the protein source and to form an aqueous soy protein solution,
    (b) separating the aqueous soy protein solution from residual soy protein source,
    (c) adjusting the pH of the soy protein solution to about 4.5 to cause precipitation of soy protein,
    (d) recovering the precipitated soy protein,
    (e) optionally adjusting the pH of the recovered soy protein to about 6, and
    (f) drying the recovered and optionally pH adjusted soy protein,
wherein following the pH adjustment step (c), the pH-adjusted material is heat treated prior to recovery of the precipitate, optional adjustment of the pH of the recovered precipitated protein and drying of the recovered precipitated protein to provide the soy protein product.

7. The method of claim 6 wherein said heat treatment is effected at a temperature of about 70° to about 160° C. for about 2 seconds to about 60 minutes.

8. The method of claim 6 wherein said heat treatment is effected at a temperature of about 80° to about 120° C. for about 15 seconds to about 15 minutes.

9. The method of claim 1 wherein said heat treatment is effected at a temperature of about 85° to about 95° C. for about 1 to about 5 minutes.

10. The method of claim 6 wherein liquid phase resulting from recovery of precipitated soy protein from the pH adjusted and optionally heat treated solution is either dried to provide a soy protein product or is further processed by membrane concentration and/or diafiltration and/or heat treated followed by drying to provide a soy protein product.

* * * * *